US008689319B2

(12) United States Patent
Gray, II et al.

(10) Patent No.: US 8,689,319 B2
(45) Date of Patent: Apr. 1, 2014

(54) NETWORK SECURITY SYSTEM

(75) Inventors: Donald C. Gray, II, Monessen, PA (US); Mike Hrabik, Omaha, NE (US)

(73) Assignee: Sollitionary, Inc., Omaha, NE (US)

( * ) Notice: Subject to any disclaimer, the term of this patent is extended or adjusted under 35 U.S.C. 154(b) by 742 days.

(21) Appl. No.: 12/714,814

(22) Filed: Mar. 1, 2010

(65) Prior Publication Data

US 2010/0218254 A1     Aug. 26, 2010

Related U.S. Application Data

(63) Continuation-in-part of application No. 10/918,171, filed on Aug. 13, 2004, now Pat. No. 7,673,049.

(60) Provisional application No. 60/563,437, filed on Apr. 19, 2004.

(51) Int. Cl.
| | |
|---|---|
| G06F 7/04 | (2006.01) |
| G06F 17/30 | (2006.01) |
| G06F 15/16 | (2006.01) |
| H04L 29/06 | (2006.01) |
| G06F 9/00 | (2006.01) |
| G06F 17/00 | (2006.01) |

(52) U.S. Cl.
USPC ............ 726/14; 726/2; 726/3; 726/4; 726/11; 726/12; 726/13

(58) Field of Classification Search
USPC .............................................. 726/2–4, 11–14
See application file for complete search history.

(56) References Cited

U.S. PATENT DOCUMENTS

| | | | | |
|---|---|---|---|---|
| 6,578,147 | B1 * | 6/2003 | Shanklin et al. | 726/22 |
| 7,039,721 | B1 * | 5/2006 | Wu et al. | 709/245 |
| 2002/0040402 | A1 * | 4/2002 | Levy-Abegnoli et al. | 709/229 |
| 2002/0104020 | A1 * | 8/2002 | Strahm et al. | 713/201 |
| 2003/0101353 | A1 * | 5/2003 | Tarquini et al. | 713/200 |
| 2004/0111636 | A1 * | 6/2004 | Baffes et al. | 713/201 |

* cited by examiner

*Primary Examiner* — Carl Colin
*Assistant Examiner* — John Elmore
(74) *Attorney, Agent, or Firm* — Anna Vishev

(57) ABSTRACT

A method and system for preventing an unacceptable data packet directed at a computing device on a first network and sent from a client device. The method includes a step of providing a network security system remotely from the first network and the client device, the network security system having a public address and including a load balancer and at least one network security subsystem having a private address, the network security subsystem further including an intrusion detection module, the load balancer of the network security subsystem receiving the data packet destined for the computing device. The load balancer translates the destination address of the packet from the public address of the network security system to the private address of the network security subsystem and forwards the packet to the intrusion detection module of the network security subsystem. The intrusion detection module then determines whether the packet is an intrusion attempt. If the packet is not the intrusion attempt, the destination address for the packet is translated to the address of the computing device, the packet source address is translated to the public address of the network security system and the packet is forwarded to the computing device. Finally, if the packet is the intrusion attempt, a network intrusion prevention technique is performed.

16 Claims, 10 Drawing Sheets

NETWORK SECURITY SYSTEM

RELATED APPLICATIONS AND CLAIM OF PRIORITY

This application claims priority to and incorporates by reference in its entirety U.S. patent application Ser. No. 10/918,171, filed on Aug. 13, 2004 and entitled "Network Security System," in turn claiming priority to U.S. Provisional Application Ser. No. 60/563,437, filed Apr. 19, 2004.

TECHNICAL FIELD

The present application is directed to intrusion detection for computer-based systems. More particularly, the present application is directed to methods and systems for inhibiting intrusion attempts originating from a networked client host from reaching a networked server host.

BACKGROUND

Computer networks provide connectivity between computing devices on local networks and/or remote networks. A connection between two remote networks typically occurs through a communications network such as the Internet. Communications over the Internet pass through a series of communication links and routers/switches, many of which are located within third-party networks that are also interconnected with the Internet. Thus, communications between two remote networks across the Internet are typically "open" because neither the sender nor the receiver controls the path that the communications traffic travels from source to destination. Rather, the path is controlled by the various providers and devices located on the Internet itself.

The connectivity between remote networks can be used to allow a client host to utilize a network-accessible service provided by a remote server host. Common network-accessible services include but are not limited to Finger, Echo, SMTP, Telnet, SSH, FTP, DNS, HTTP and HTTPS as well as those services utilizing IP Protocol 50, ICMP, TCP/IP and UDP.

Because private networks are connected to an open system such as the Internet, security is of great concern when communicating with other private networks via network-accessible services. Often, network administrators install firewall devices, intrusion detection devices, intrusion prevention devices and/or other buffers on a local area network ("LAN") in order to screen and/or filter incoming and/or outgoing content from the local network. Alternatively, system administrators can install firewall, intrusion detection, or intrusion prevention software on a local host within a LAN in order to screen and/or filter incoming and/or outgoing content from the local host. This can require the network administrator and/or the system administrator to install complex and costly equipment and/or software in order to ensure that the local network and/or local host is protected.

Exemplary network security systems are described in U.S. Pat. No. 6,687,831 to Albaugh et al.; U.S. Pat. No. 6,654,882 to Froutan et al.; U.S. Pat. No. 6,321,336 to Applegate et al.; U.S. Pat. No. 5,892,903 to Klaus; and U.S. Pat. No. 5,557,752 to Smaha et al. However, each of these network security systems requires the installation of costly and/or complex equipment and/or software.

What are needed are improved methods and systems for inhibiting intrusion attempts directed at network-accessible services.

SUMMARY

Before the present methods, systems and materials are described, it is to be understood that this invention is not limited to the particular methodologies, systems and materials described, as these may vary. It is also to be understood that the terminology used in the description is for the purpose of describing the particular versions or embodiments only, and is not intended to limit the scope of the invention which will be limited only by the appended claims.

It must also be noted that as used herein and in the appended claims, the singular forms "a," "an," and "the" include plural references unless the context clearly dictates otherwise. Thus, for example, reference to a "communication request" is a reference to one or more communications requests and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments of the invention, the preferred methods, materials, and devices are now described. All publications mentioned herein are incorporated by reference. Nothing herein is to be construed as an admission that the invention is not entitled to antedate such disclosure by virtue of prior invention.

In an embodiment, a system provides protection against intrusion attempts directed at network-accessible services and methods covering the initiation of the use of the system and the perfection of the intrusion protection provided by the system through a demonstrative base-lining process.

In an embodiment, the system includes one or more networks, network devices and computing devices that provide firewall, intrusion detection and/or intrusion prevention protection for a server host on a private network that provides network-accessible service(s) through a connection to an open communications network such as the Internet from intrusion attempts initiated by a client host on a private network connected to an open communications network such as the Internet.

In an embodiment, the system includes one or more networks, network devices and computing devices that provide firewall, intrusion detection and/or intrusion prevention protection for a client host on a private network connected to an open communications network such as the Internet from intrusion attempts initiated by a server host on a private network that provides network-accessible service(s) through a connection to an open communications network such as the Internet.

In an embodiment, the system provides intrusion protection for a plurality of client hosts and multiple server hosts providing network-accessible service(s) limited only by the number of public IP addresses available to the service provider hosting the system.

The system, in conjunction with the methods, may permit the protection of a client host on a private network connected to an open communications network such as the Internet or a server host providing network-accessible service(s) on a private network connected to an open communications network such as the Internet with no hardware or software installation required on the client host, client private network, server host or server private network.

Through execution of the invented method of initiating protection of a server host providing network-accessible service(s) on a private network connected to an open communications network such as the Internet, the system may intercept the traffic between the client host and server host by having a domain name server, which provides authoritative responses for the server host, advertise the public IP address of the system as the actual public IP address of the server host.

In an embodiment, the system does not store the intercepted traffic other than to process the traffic. The system may examine the traffic in real time such that communications between the client host and the server host providing the network-accessible service(s) are not perceptibly delayed. In this embodiment, the system is used for many or all network-accessible services, such as interactive network-accessible services.

The system is capable of providing intrusion protection for any common interactive network-accessible service(s) including but not limited to Finger, Echo, SMTP, Telnet, SSH, FTP, DNS, HTTP, and HTTPS as well as those services utilizing IP Protocol 50, ICMP, TCP/IP, and UDP.

BRIEF DESCRIPTION OF THE DRAWINGS

Aspects, features, benefits and advantages of the embodiments will be apparent with regard to the following description and accompanying drawings where.

DETAILED DESCRIPTION

Embodiments of the present invention include methods and systems for inhibiting or preventing intrusion attempts from occurring between a client host on a private network connected to an open communications network such as the Internet and a server host providing network-accessible service(s) on a private network connected to the open communications network. In an embodiment, the present invention may prevent intrusion attempts without the need for substantial additional computer software or hardware devices on the private networks, the client host or the server host.

Figure 1:
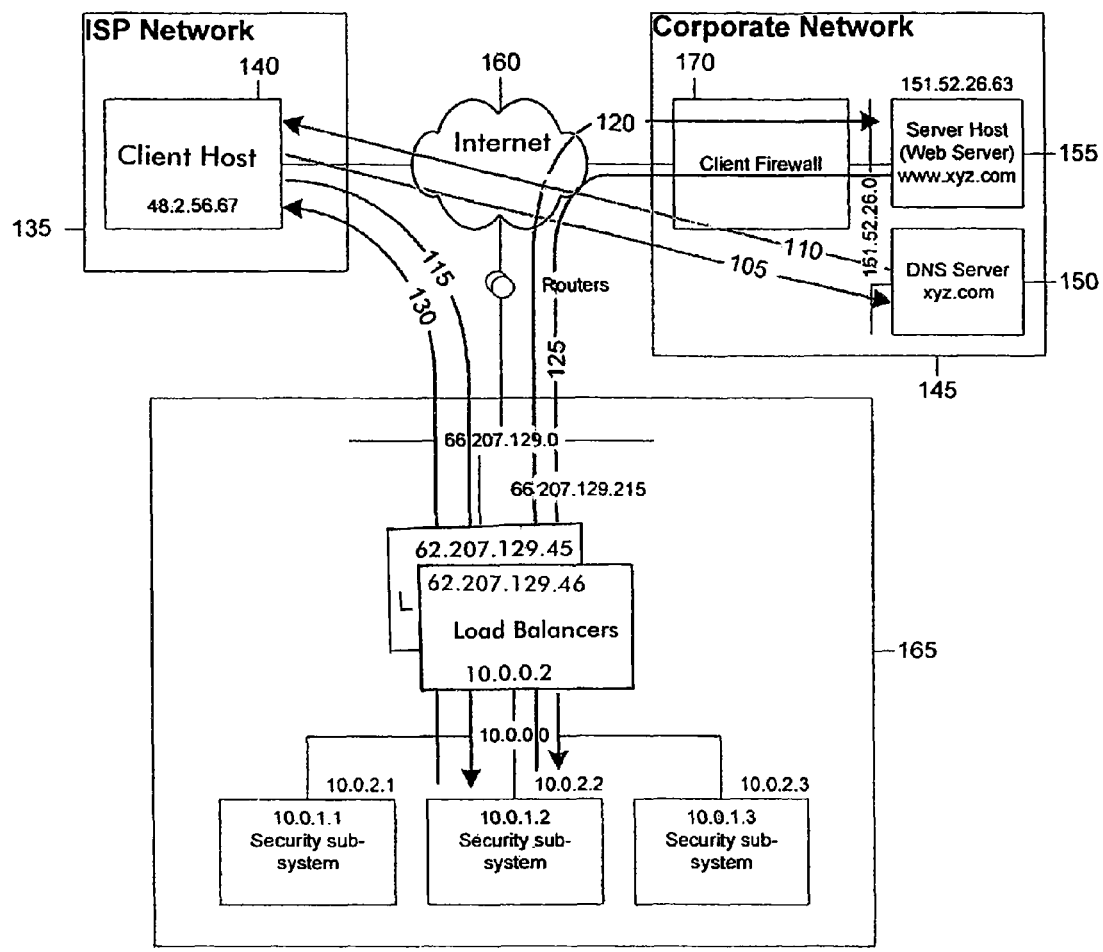
FIG. 1 is a network diagram depicting an overview of an exemplary physical flow of communication requests from a client host to a server host and communication responses from a server host to a client host through an embodiment of a security system.
Figure 1:
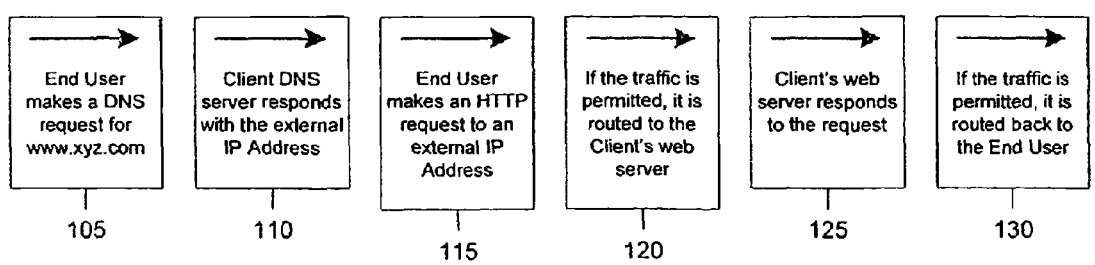
Figure 2:
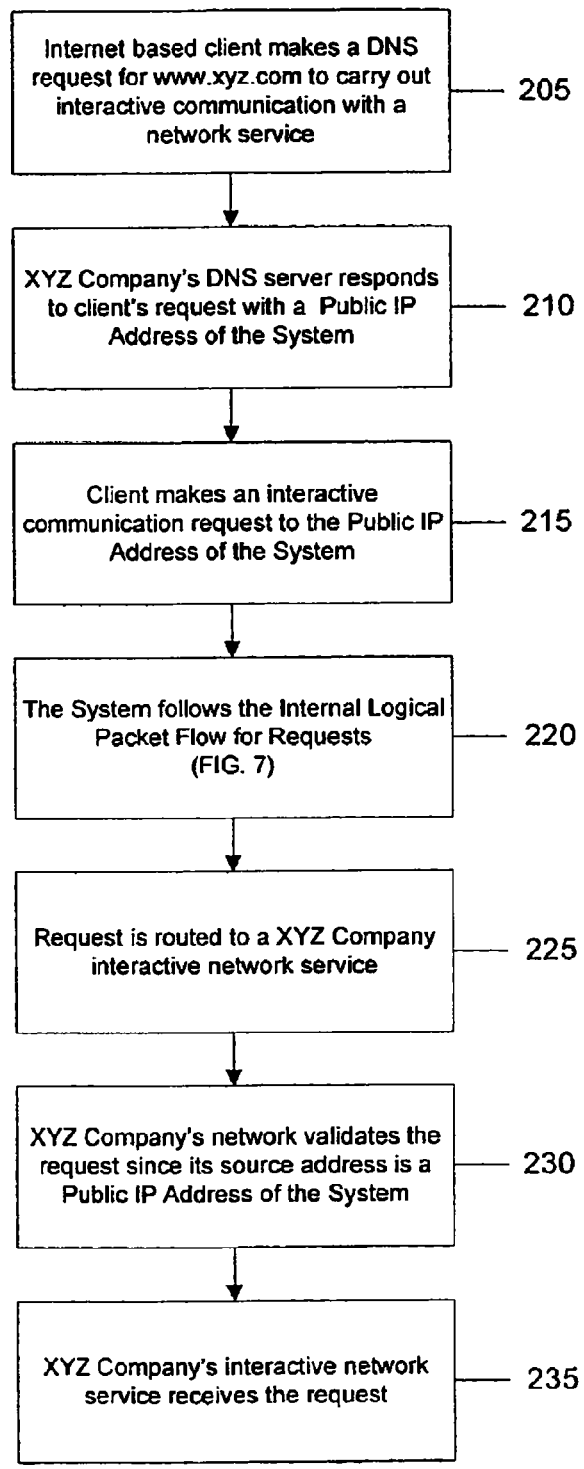
FIG. 2 is a process diagram depicting an exemplary logic flow of communication requests from a client host to a server host through a security system.
Figure 3:
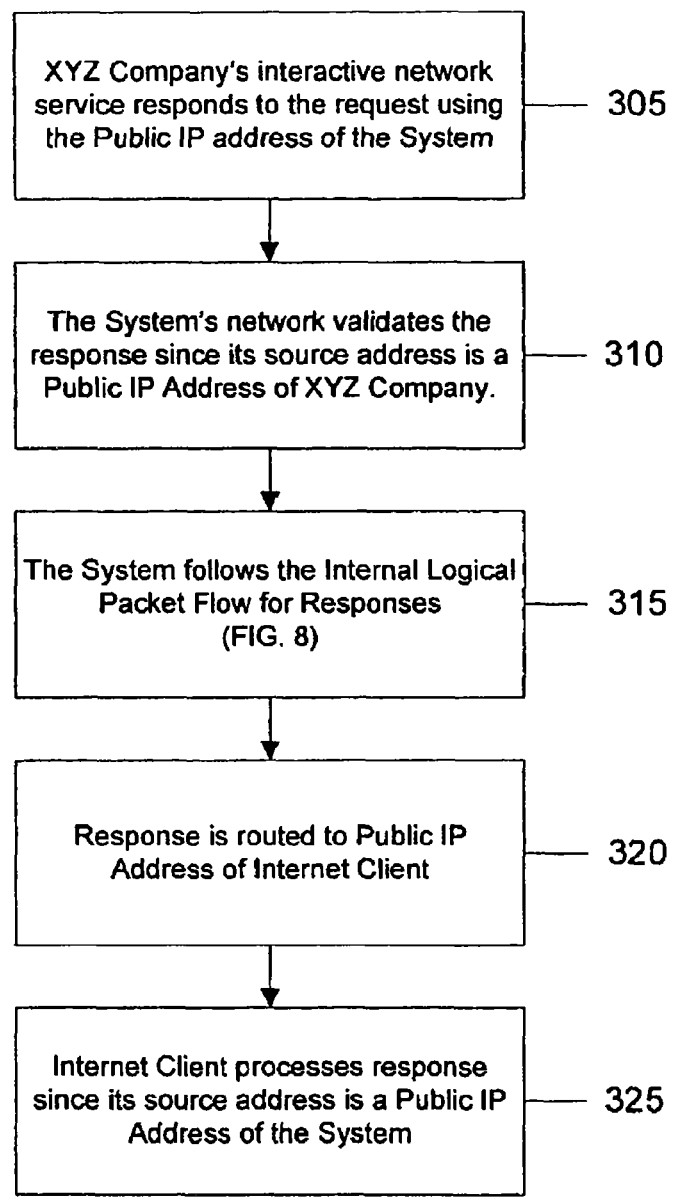
FIG. 3 is a process diagram depicting an exemplary logic flow of communication responses from a server host through a security system.

FIGS. 1-3 illustrate an exemplary communication process between a client host 140 on a private network connected to an open communications network such as the Internet 160 and a server host 155 providing network-accessible service(s) on a private network connected to the open communications network 160. The client host 140 may be part of a first private network such as an Internet service provider (ISP) network 135. The server host 155 may be a web server that is part of a second private network such as a corporate network 145.

In order to communicate with a network-accessible service on the server host 155, the client host 140 may transmit a request 105 (step 205 in FIG. 2) to an authoritative domain name server 150 for the server host 155 to resolve its public IP address. The authoritative domain name server 150 may respond 110 (step 210 in FIG. 2) with a public IP address (e.g., 66.207.129.215 in FIG. 1) for a separate security system or network 165 assigned to protect the server host 155 providing the network-accessible service instead of, as is typically done, the true public IP address of the server host 155 (e.g., 151.52.26.63 in FIG. 1).

The client host 140 may then transmit its communication request 115 (step 215 in FIG. 2). The communication request 115 (step 215 in FIG. 2) is transmitted to the security system 165 because of the IP address provided by the DNS server. The security system 165 may perform a series of processing steps (220 in FIG. 2) to determine whether the communication request 115 is an intrusion attempt. If the communication request 115 is determined to be non-intrusive, the security system 165 may forward the communication request 120 (step 225 in FIG. 2) to the network-accessible service on the server host 155. The client firewall 170 permits the communication request (step 230 in FIG. 2) to enter the corporate network 145 because it comes from a public IP address of the security system 165. The server host 155 then receives the communication request 120 (step 235 in FIG. 2).

The server host 155 may perform any necessary processing and generate a response 125 to the forwarded communication request 120, if required. If generated, the response 125 may first be sent to the security system 165 (step 305 in FIG. 3) since the forwarded communication request 120 originated from the security system 165. The security system 165 may receive the response 125 (step 310 in FIG. 3) and perform a series of processing steps (315 in FIG. 3) designed to determine whether the response 125 is an intrusion attempt. If the response 125 is determined to be non-intrusive, the security system 165 may then forward the response 130 (step 320 in FIG. 3) to the client host 140, which processes the response 130, 325. In an embodiment, the server host 155 transmits the response 125 directly to the client host 140.

In an embodiment, some or all of the processing steps performed by the security system 165 between the original communication request 115 and the forwarded communication request 120 and/or between the response 125 and the forwarded response 130 occur in real time without storing the communications requests 115 and 120 or the responses 125 and 130 other than as required for real time processing. Thus, the security system 165 may permit interactivity between the client host 140 and server host 155 without any perceptible delay in communication between the two systems. This allows the security system 165 to be used for providing intrusion protection to interactive and/or batch network-accessible services, including but not limited to Finger, Echo, SMTP, Telnet, SSH, FTP, DNS, HTTP and HTTPS, as well as those services utilizing IP Protocol 50, ICMP, TCP/IP and UDP.

In an alternate embodiment, the devices of the security system 165 may be located on the corporate network 145. In such an embodiment, the devices of the security system 165 perform the series of processing steps (220 in FIG. 2) to determine whether the communication request 115 is an intrusion attempt and forward the communication request 120 (steps 225 and 230 in FIG. 2) to the network-accessible service on the server host 155 if the communication request 115 is non-intrusive. Likewise, the devices of the security system 165 may perform the series of processing steps (315 in FIG. 3) to determine whether the response 125 is an intrusion attempt and forward the response 130 (step 320 in FIG. 3) to the client host 140 via the communications network 160 if the response 130 is non-intrusive.

In an alternate embodiment, the devices of the security system 165 are located on the client network 135. In such an embodiment, the devices of the security system 165 perform the series of processing steps 220 to determine whether the communication request 115 is an intrusion attempt and forward the communication request 120 (steps 225 and 230 in FIG. 2) via the communications network 160 to the network-accessible service on the server host 155 if the communication request 115 is non-intrusive. Likewise, the devices of the security system 165 may perform the series of processing steps (315 in FIG. 3) to determine whether the response 125 is an intrusion attempt and forward the response 130, (step 320 in FIG. 3), to the client host 140 if the response 130 is non-intrusive.

In an embodiment, the security system 165 may maintain an event log of the requests 115 and responses 125 that pass through the security system 165. In an embodiment, the event log may maintain only a partial copy of a request 115 or a response 125.

Figure 4:
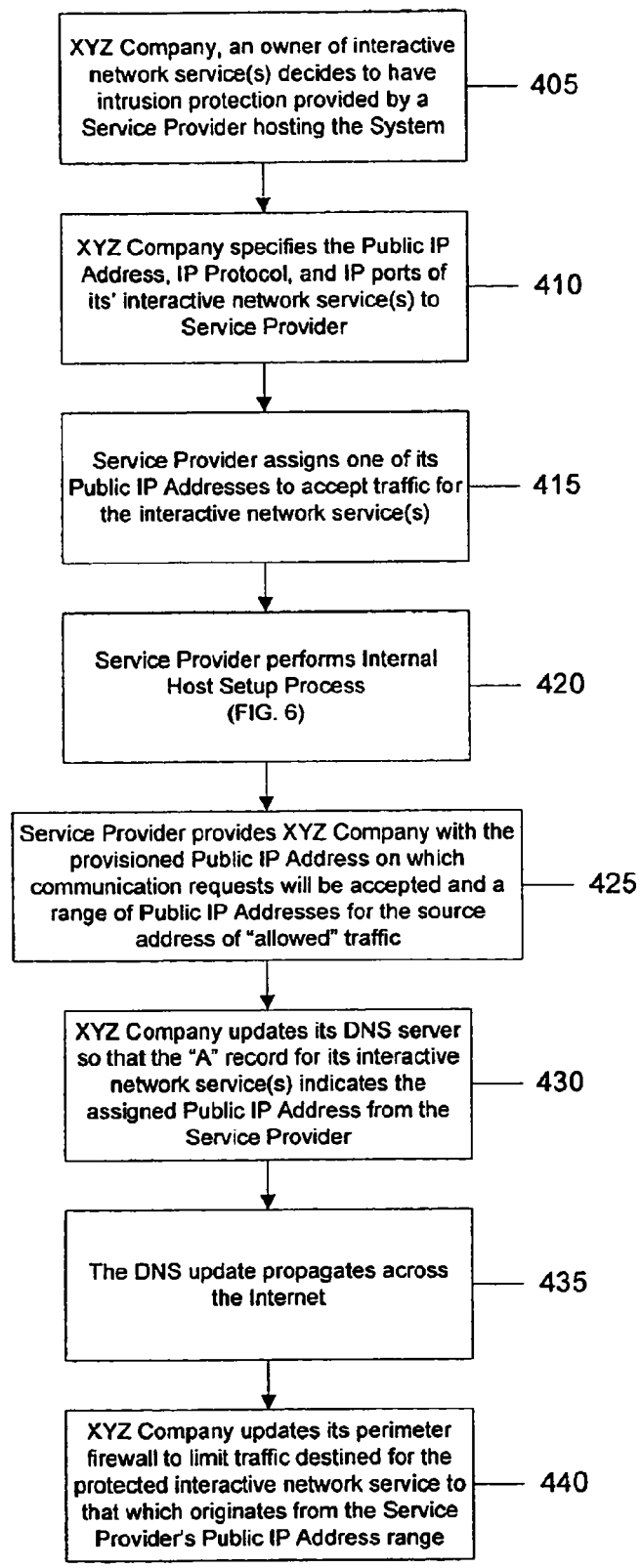
FIG. 4 is a process diagram depicting an exemplary method for initiating protection of a server host.
Figure 6:
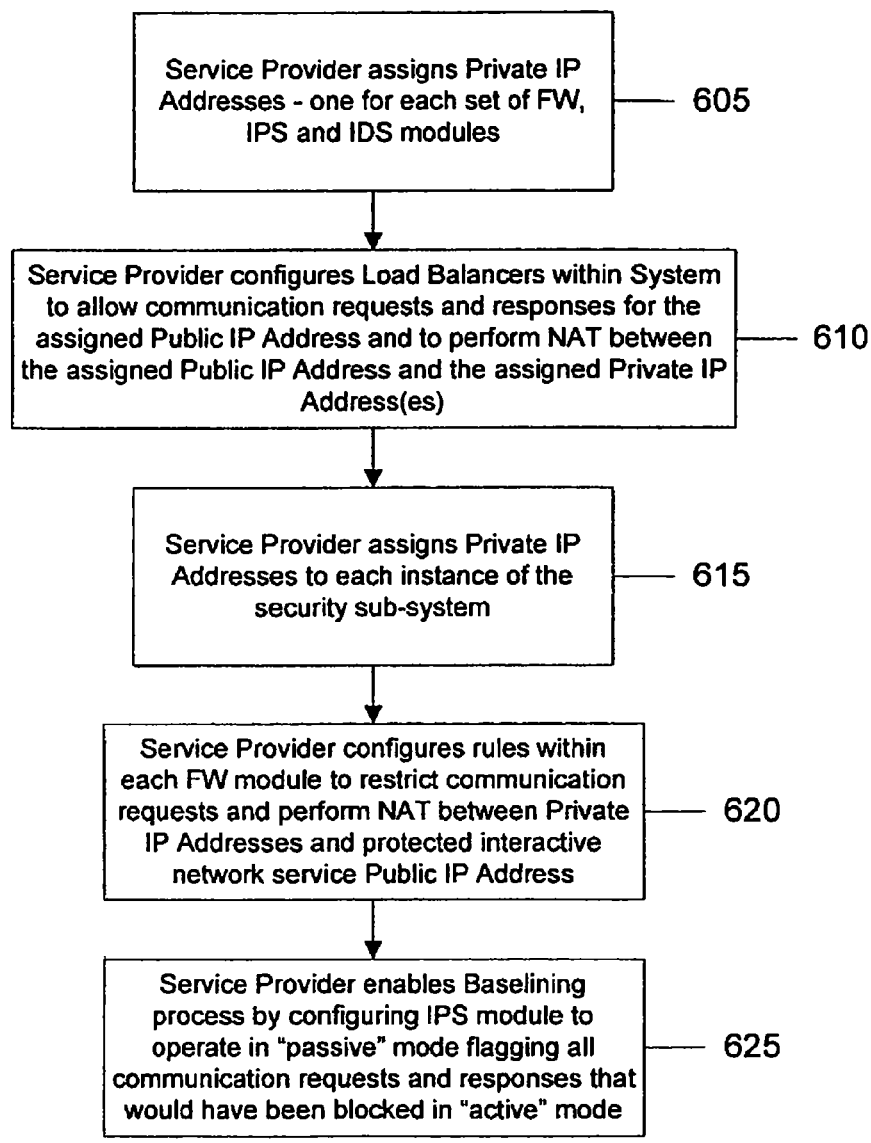
FIG. 6 is a process diagram depicting an exemplary method for configuring a security system to provide protection of a server host.

FIGS. 1 and 4 illustrate a method of configuring the security system 165 to initiate network intrusion protection of a server host 155 providing network-accessible service(s), and the resultant configuration within the server host 155. Initially, an owner of a server host 155 providing a network-accessible service(s) may contact 405 a service provider hosting the security system 165 to provide network intrusion protection. The owner may communicate (step 410) the public IP address, IP protocol(s) and IP port(s) of the server host 155 to the service provider. The service provider may assign (step 415) a public IP address within the public network segment of the security system 165 (e.g., 66.207.129.215 in FIG. 1) to accept communication requests for and/or responses from the specified server host 155. The service provider may execute (step 420) the "Internal Host Setup Process" upon the security system, as shown in FIG. 6 and described in more detail below, to configure the security system 165 to perform intrusion protection for the specified server host 155 and its network-accessible services.

The service provider may then communicate (step 425) the assigned public IP address (66.207.129.215) to the owner of the server host 155. The owner of the server host 155 may update (step 430) the configuration of its domain name server 150 such that the "A" record for the server host 155 indicates the service provider provisioned public IP address (66.207.129.215) rather than the public IP address of the server host 155 (e.g., 151.52.26.63 in FIG. 1). The nature of the domain name server infrastructure dictates that this change will propagate (step 435) through the entire communications network 160 within a specified time period, such as 72 hours.

In an embodiment, the owner of the server host 155 may configure a perimeter firewall 170 to restrict inbound network traffic with a destination address corresponding to the public IP address of the server host 155 (e.g., 151.52.26.63) to traffic having a source address corresponding to the public IP address assigned by the security system 165 (step 440). Such an embodiment may provide a heightened level of network intrusion protection.

By providing network intrusion protection between the client host 140 and the server host 155, the security system 165 inhibits or prevents viruses, worms, directed intrusion attempts and other malicious traffic from reaching and/or being delivered from the server host 155. In addition, by being loosely coupled with both the private network 135 of the client host 140 and the private network 145 of the server host 155 through an open communications network 160, the security system 165 may provide network intrusion protection for multiple client hosts 140 belonging to multiple private networks 135 and multiple server hosts 155 belonging to multiple private networks 145 simultaneously. As such, economies of scale may be achieved since no additional devices or computing software are required on the client host 140, the client host's private network 135, the server host 155 or the server host's private network 145.

Figure 5:
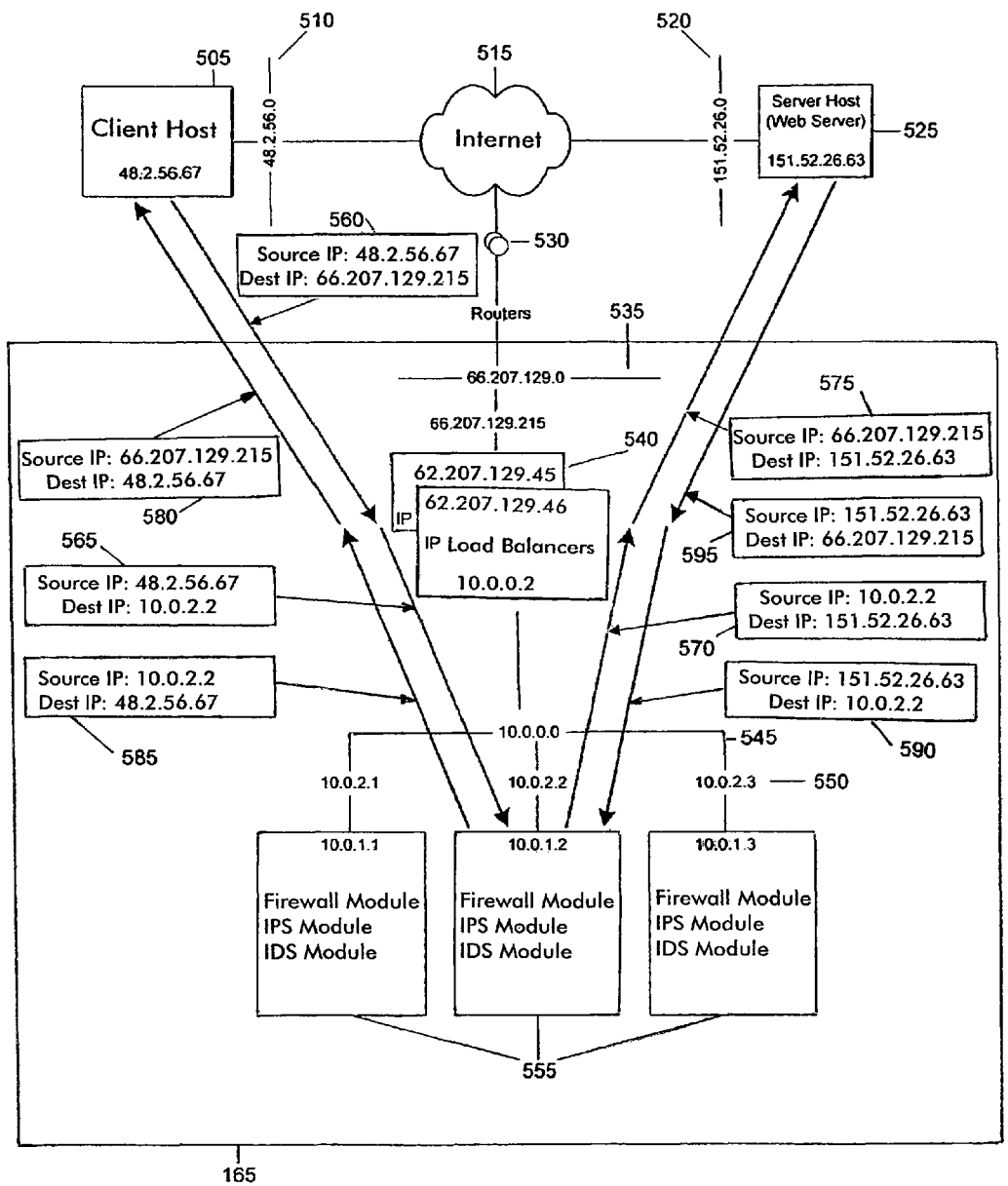
FIG. 5 is a network diagram depicting an exemplary physical flow of communication requests from a client host to a server host and communication responses from a server host to a client.

FIG. 5 illustrates a detailed network diagram of an embodiment of a security system 165 and the packet translations that occur when the security system 165 is used to provide intrusion protection between a client host on a first private network connected to an open communications network such as the Internet and a server host providing network-accessible service(s) on a second private network connected to the open communications network. The client host 505 is part of a first private network such as an ISP network 510 connected to an open communications network 515. The first private network may include network devices, such as routers, firewalls, proxies, etc., that connect the client host 505 to the ISP network 510. These network devices may perform address translations, routing and/or other communication techniques and functions. Regardless of the intermediary network devices and intermediary network processing, the client host 505 may be reachable via a public IP address (e.g., 48.2.56.67 in FIG. 5). The public IP address may allow the client host 505 to communicate over the open communications network 515.

The server host 525 may be part of a second private network, such as a corporate network 520 connected to the open communications network 515. The second private network may include network devices, such as routers, firewalls, proxies, etc., that connect the server host 525 to the corporate network 520. These network devices may perform address translations, routing and/or other communication techniques and functions. Regardless of the intermediary network devices and intermediary network processing, the server host 525 may be reachable via a public IP address (e.g., 151.52.26.63 in FIG. 5). The public IP address may allow the server host 525 to communicate over the open communications network 515.

FIGS. 5 and 6 illustrate a method of configuring the security system 165 to initiate network intrusion protection of a server host 525 providing network-accessible service(s) and the resultant configuration within the security system 165. The security system 165 may be part of a private network connected to an open communications network such as the Internet 515. Referring to FIG. 5, the security system may have a private network that includes a public network segment 535 having a plurality of public IP addresses and an internal network segment 545 having a plurality of private IP addresses. In an embodiment, the public IP addresses may include a public IP address associated with the public IP address of a server host 525. One public IP address (e.g., 66.207.129.215 in FIG. 5) may provide network intrusion protection for the server host 525. Accordingly, a one-to-one relationship may exist between a public IP address of the server host 525 (e.g., 151.52.26.63 in FIG. 5) and the assigned public IP address (66.207.129.215).

The private IP addresses for use on the private network segment 545 within the security system may be assigned a private IP address 605 (e.g., 10.0.2.1, 10.0.2.2 and 10.0.2.3 550 may each be assigned to a security sub-system 555 within the security system 165). As such, a one-to-many relationship may exist between the public IP address (66.207.129.215) and the private IP addresses 550 (10.0.2.1, 10.0.2.2 and 10.0.2.3).

Within the security system 165, the assigned public IP address (66.207.129.215) may exist as a virtual IP address assigned to and shared between IP network load balancers 540. The load balancers 540 may provide address translation and routing between the public network segment 535 within the security system 165 and the private network segment 545 within the security system. More specifically, the network load balancers 540 may perform 610 network address translation and routing between the virtual public IP address (66.207.129.215) and the private IP addresses 550 (10.0.2.1, 10.0.2.2 and 10.0.2.3).

The security system 165 may include the above described network communications framework and a security sub-system 555. The security sub-system 555 may include computing devices that perform load-balancing and failover protection. The computing devices may be configured with multiple computer software programs, referred to herein as "modules," which provide network firewall functionality, network intrusion prevention (IPS) functionality and/or network intrusion detection (IDS) functionality.

Each computing device may operate in one of two modes: passive and active. When the computing devices are passive, no network intrusion prevention functionality is performed. However, network intrusion protection may still be realized through the network firewall module and the intrusion detection module. When the computing devices are active, full network intrusion protection may be provided including network intrusion prevention. Each assigned private IP address 550 (10.0.2.1, 10.0.2.2 and 10.0.2.3) may be assigned 615 to a particular security sub-system 555 computing device.

The network firewall modules of the security sub-system 555 may perform TCP/IP layer 3 network traffic filtering based on, for example, source and/or destination IP addresses, source and/or destination TCP/IP ports, and IP protocols. The network firewall modules may further perform 620 network address translation between private IP addresses. In addition, a firewall module may be implemented as an Ethernet router device. In other words, the firewall module may perform "inbound" and "outbound" processing using, for example, two Ethernet network interface controllers that route traffic between "inbound" and "outbound" interfaces. As such, the firewall module may perform "inbound" processing, including filtering and network address translation; "outbound" processing, including filtering and network address translation; and additional "in between" processing, including forwarding IP packets to an intrusion prevention module for examination.

Each firewall module of each computing device within the security sub-system may be configured 620 to allow communication requests using the specified IP protocol(s), and/or TCP/IP port(s) for the protected network-accessible service(s) provided by the protected server host 525. In addition, each firewall module of each computing device may be configured 620 to perform network address translation between an assigned private IP address (e.g., 10.0.2.2) 550 and the public IP address (151.52.26.63) of the protected server host 525.

In an embodiment, if the firewall module receives an IP packet that does not meet its filtering criteria for allowed network traffic, the IP packet is discarded. In an embodiment, the discard event is logged. In an alternate embodiment, at least a portion of the IP packet is saved. In an embodiment, an alert is sent to a system administrator or a network administrator. In an embodiment, a message is transmitted to the sender of the IP packet.

The network intrusion prevention module of the security sub-system 555 may perform, for example, TCP/IP layer 3 through TCP/IP layer 7 packet examinations. The network intrusion prevention module may reassemble IP packets that have been fragmented, whether intentionally to mask the contents of the IP packet or because of IP packet size limitations within any of the network devices through which the IP packet traversed. The network intrusion prevention module may then examine characteristics of the IP packet including, for example, various packet header values and/or the contents of the packet data payload. These characteristics and packet data payload may then be compared with a database of known network intrusion attempt signatures. If a match exists, the mode (passive v. active) of the computing device on which the network intrusion prevention module resides may determine how the IP packet is handled 625. If the computing device is passive, the matched IP packet may not be discarded. However, the fact that the IP packet would have been discarded had the computing device been active and data including, for example, at least a partial copy of the IP packet header and IP packet data payload may be logged. If the computing device is active, the matched IP packet may be discarded. Moreover, the fact that the IP packet was discarded and data including, for example, at least a partial copy of the IP packet header and IP packet data payload may be logged. If a match does not exist, the IP packet may be forwarded to its destination.

The network intrusion detection module of the security sub-system 555 may similarly be capable of performing, for example, TCP/IP layer 3 through TCP/IP layer 7 packet examinations. The network intrusion detection module may first reassemble IP packets that have been fragmented, whether intentionally to mask the contents of the IP packet or because of IP packet size limitations within any of the network devices through which the IP packet traversed. The network intrusion detection module may then examine characteristics of the IP packet including, for example, various packet header values and/or the contents of the packet data payload. This examination may occur because the intrusion detection module "listens" to all IP traffic traversing the routed Ethernet interface of the computing device. These characteristics and packet data payload may be compared with a database of known network intrusion attempt signatures. If a match exists, the fact that the IP packet was matched and data including, for example, at least a partial copy of the IP packet header and/or the IP packet data payload may be logged. If a match does not exist, the IP packet may be permitted to continue toward its destination.

Referring to FIG. 5, a communication request 560 may be transmitted from a client host 505 with a public IP address (e.g., 48.2.56.67 as in FIG. 5). The communication request 560 may be directed, by the end-user of the client host 505, to a protected network-accessible service provided by a server host 525 with a public IP address (e.g., 151.52.26.63 as in FIG. 5). The security system may intercept the request because of the special configuration of the domain name server that provides authoritative responses for the server host 525. As such, this communication request 560 has a source IP address equal to the public IP address of the client host (48.2.56.67) and a destination IP address equal to the public IP address assigned for the protection of the server host 525 to the security system (e.g., 66.207.129.215 as in FIG. 5).

Figure 7:
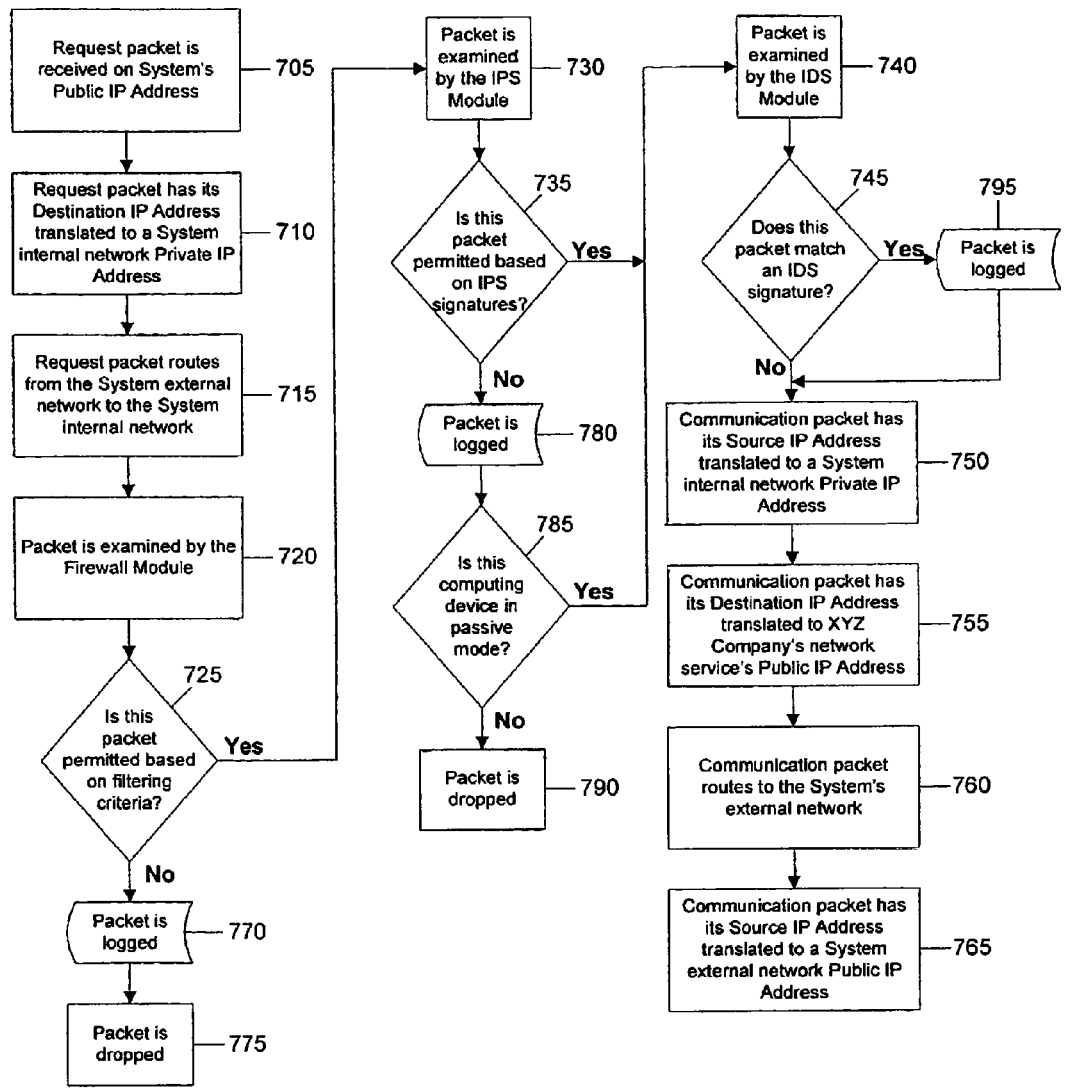
FIG. 7 is a process diagram depicting an exemplary logic flow of communication requests from a client host to a server host through a security system.

Referring to FIG. 7, the network load balancers 540 of the security system may receive 705 the communication request 560. The network load balancers 540 may translate the destination IP address to one of the private IP addresses 710 assigned for the protection of the server host 525 to a specific computing device within the security system's security sub-system 555 (e.g., 10.0.2.2 as in FIG. 5). The communication request 565 may then be routed 715 to the specific computing device within the security sub-system.

The computing device may perform intrusion protection processing including, for example, the firewall module 720 making a determination 725 of whether the communication request 565 is permitted based on the firewall module's filtering criteria. If the communication request 565 is not permitted, the fact that it is not permitted may be logged 770, and the communication request may be discarded 775. In an alternate embodiment, the computing device generates an alert if the request 565 is not permitted. In an alternate embodiment, the computing device generates a message to the sender if the request 565 is not permitted. In an alternate embodiment, the computing device saves at least a portion of the communication request 565 if the request is not permitted.

If the communication request 565 is permitted, it may be presented to the intrusion prevention module 730 for examination. The intrusion prevention module may determine 735 whether the communication request 565 is permitted based on whether or not it matches one of a plurality of intrusion prevention signatures. If the communication request 565 matches an intrusion prevention signature, the fact that it matched and data including, for example, at least a partial copy of the communication request's IP packet header and/or the IP packet data payload may be logged 780. A determination 785 of the operating mode of the current security sub-system computing device may be made. If the current computing device is active, the communication request 565 may be discarded 790. Alternately, at least a portion of the communication request 565 may be saved. Alternately or additionally, an alert and/or a message may be generated. If the current computing device is passive, the communication request 565 may be allowed to pass to the "outside" interface of the routed Ethernet connection maintained by the firewall module of the security sub-system 555.

During the traversal of the routed Ethernet interface, the intrusion detection module 740 may examine the communication request 565 to determine 745 whether the communication request matches one of a plurality of intrusion detection signatures. If the communication request 565 matches an intrusion detection signature, the fact that it matched and data including, for example, at least a partial copy of the communication request's IP packet header and IP packet data payload may be logged 795. Alternatively, the intrusion detection module 740 may include additional decision capabilities to identify and prevent malicious or undesirable communication requests 565. Such decision capabilities may include an application security aware detection, e.g., SQL injection, cross-site scripting and/or command injection. Additionally, the communication request 565 may be filtered based on message content. For example, a user may specify certain inappropriate or undesirable content which is not allowed to be passed through the intrusion detection module 740. The intrusion detection module 740 then scans the content of the communication request 565 and determines whether it includes the specified inappropriate or undesirable content. If the communication request 565 is determined to include such content, the communication request may be discarded or quarantined until a user, a network administrator or any other entrusted person makes a determination of whether the communication request may be passed through. Further, the intrusion detection module may include a source based identification capability. In this embodiment, if the source of the communication request 565 has been identified as a malicious source, preferably by a data source outside the networks (e.g., google safe browsing list), the communication request is similarly discarded or quarantined. If the communication request 565 was not discarded during the prior processing, upon reaching the "outside" interface of the routed Ethernet connection, the firewall module may translate 750 the source IP address of the communication request to the private IP addresses assigned for the protection of the server host 525 to the current computing device within the security system's security sub-system 555 (10.0.2.2).

The firewall module may then translate 755 the destination IP address of the communication request to the public IP address of the protected server host 525 (151.52.26.63). The computing device may then route the communication request to the network load balancers 540, which may translate 765 the source IP address of the communication request 570 to the public IP addresses assigned for the protection of the server host 525 to the security system (66.207.129.215). The communication request 575 may then be routed normally through the open network 515 to the protected server host 525.

Referring to FIG. 5, a response 595 to a previous communication request 575 may be transmitted from a protected server host 525 having an IP address (e.g., 151.52.26.63). The response 595 may be directed towards the security system with a destination IP address of, for example, 66.207.129.215. This may occur because the communication request 575 originated from the security system 165. As such, the response 595 may have a source IP address equal to the IP address of the server host 525 (151.52.26.63) and a destination IP address equal to the public IP address assigned for the protection of the server host 525 to the security system 165 (66.207.129.215).

Figure 8:
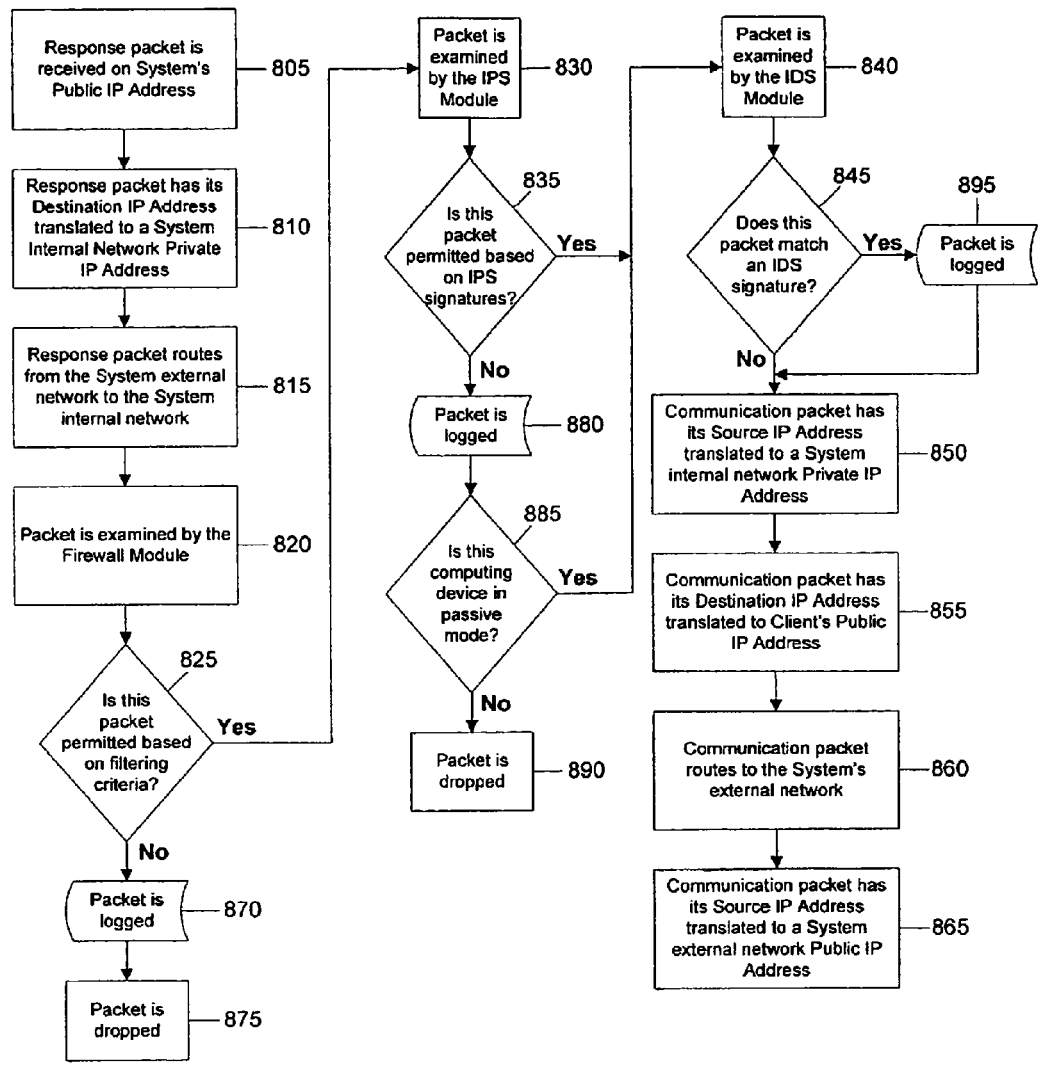
FIG. 8 is a process diagram depicting an exemplary logic flow of communication responses from a server host to a client host through the security system.

Referring to FIG. 8, the network load balancers 540 of the security system may receive 805 the response 595 and may translate 810 its destination IP address to one of the private IP addresses assigned for the protection of the server host 525 to a specific computing device within the security system's security sub-system 555 (e.g., 10.0.2.2). The response 590 may be routed 815 to the specific computing device.

The computing device may perform intrusion protection processing including, for example, the firewall module 820 making a determination 825 of whether the response 590 is permitted based on the firewall module's filtering criteria. Such filtering criteria may include content filtering to ensure that confidential or sensitive information is not included in the response 590. If the response 590 is not permitted, the fact that it is not permitted may be logged 870, and the response may be discarded 875. In an alternate embodiment, the computing device generates an alert if the response 590 is not permitted. In an alternate embodiment, the computing device generates a message to the sender if the response 590 is not permitted. In an alternate embodiment, the computing device saves at least a portion of the response 590 if it is not permitted.

If the response 590 is permitted, it may be presented to the intrusion prevention module 830 for examination. The intrusion prevention module may determine 835 whether the response 590 is permitted based on whether or not it matches one of a plurality of intrusion prevention signatures. If the response 590 matches an intrusion prevention signature, the fact that it matched and data including, for example, at least a partial copy of the response's IP packet header and/or the IP packet data payload may be logged 880. A determination 885 of the operating mode of the current security sub-system computing device may be made. If the current computing device is active, the response 590 may be discarded 890. Alternately, at least a portion of the response 590 may be saved. Alternately or additionally, an alert and/or a message may be generated. If the current computing device is passive, the response 590 may be allowed to pass to the "outside" interface of the routed Ethernet connection maintained by the firewall module of the security sub-system 555.

During the traversal of the routed Ethernet interface, the intrusion detection module 840 may examine the response 590 to determine 845 whether the response matches one of a plurality of intrusion detection signatures. If the response 590 matches an intrusion detection signature, the fact that it matched and data including, for example, at least a partial copy of the response's IP packet header and IP packet data payload may be logged 895. If the response 590 was not discarded during the prior processing, upon reaching the "outside" interface of the routed Ethernet connection, the firewall module may translate 850 the source IP address of the response to the private IP addresses assigned for the protection of the server host 525 to the current computing device within the security system's security sub-system 555 (10.0.2.2).

The firewall module may then translate 855 the destination IP address of the response to the public IP address of the client host 505 (48.2.56.67). The computing device may then route the response 585 to the network load balancers 540, which may translate 865 the source IP address of the response to the public IP addresses assigned for the protection of the server host 525 to the security system (66.207.129.215). The response 580 may then be routed normally through the open network 515 to the client host 505.

Figure 9:
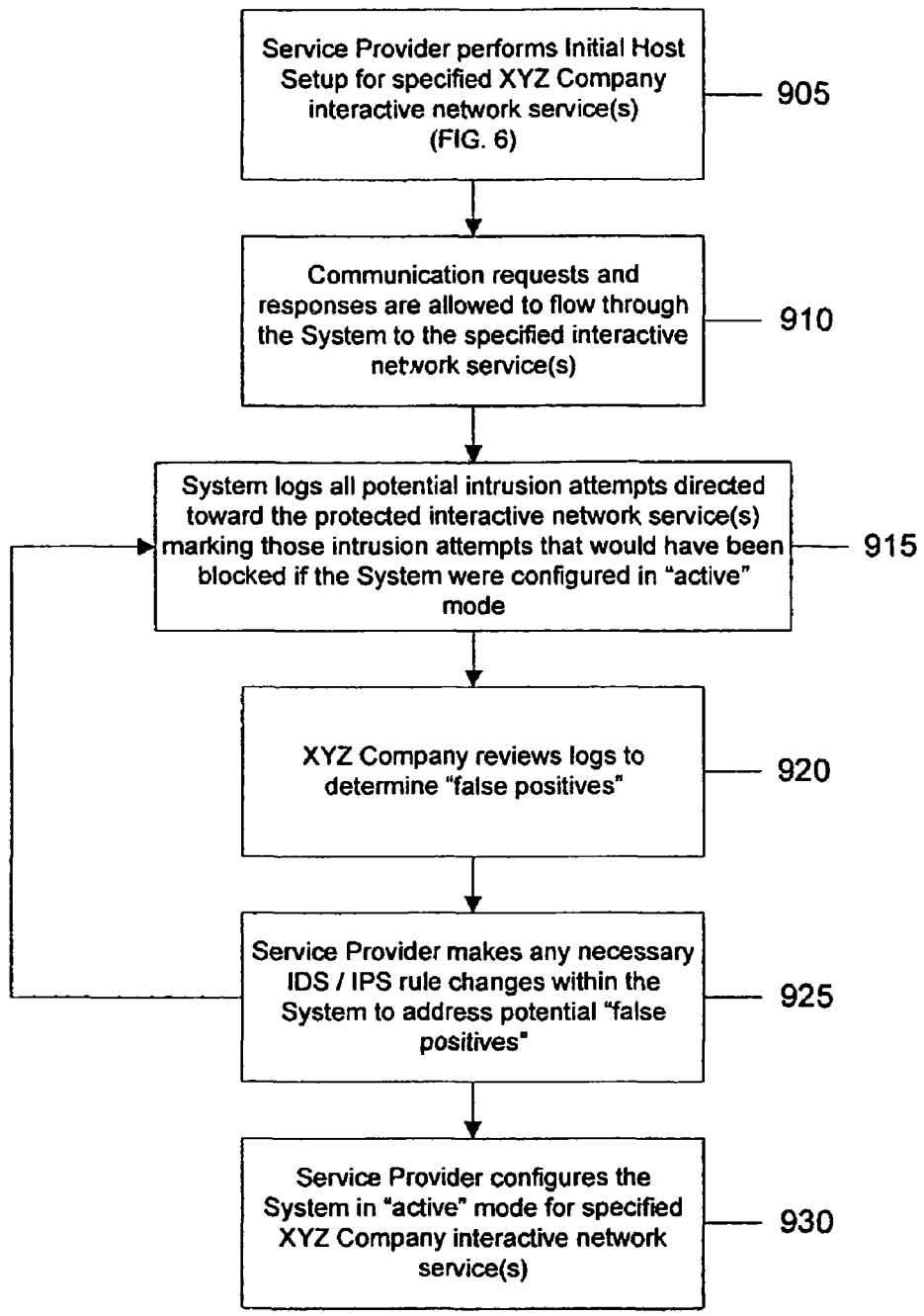
FIG. 9 is a process diagram depicting an exemplary method for refining the configuration of a security system through a demonstrative base-lining process.

FIGS. 1 and 9 illustrate a method of utilizing the security system 165 to refine and/or perfect the network intrusion protection of a server host 155 providing network-accessible service(s) and the resultant configuration within embodiments of the security system 165. The service provider may perform 905 the Initial Host Setup method, as shown in FIG. 6, to provide network intrusion protection to a server host 155 providing a network-accessible service(s). After this initial setup, the computing device within the security sub-system of the security system 165 may operate in passive mode. Communication requests and responses to communication requests may then be allowed to flow 910 through the security system 165. The security system may log 915 all potential network intrusion attempts directed at the protected network-accessible service(s) that would have been blocked had the security system been configured in active mode. In addition, the owner of the protected server host 155 may review the logs 920 to determine potential false positives (i.e., communication requests and responses that the security system 165 determines to be intrusion attempts that are not actually intrusion attempts). The service provider may adjust 925 the intrusion prevention signatures and/or intrusion detection signatures (combined, the network intrusion attempt signatures) to eliminate or reduce the occurrence of such false positives. This learning process may iterate until the owner of the protected server host 155 is comfortable with the actions that would be performed by the security system when operating in active mode. Upon reaching this comfort level, the service provider may configure 930 the computing device within the security sub-system to operate in active mode in order to provide a heightened level of network intrusion protection to the server host 155.

Although the invention is described in connection with specific networks, the system may include a capability allowing an outside party (outside the networks) to retrieve operating information using a defined application programming interface. The inventive system is then placed in a "cloud," and a customer is allowed to quest it for some specific information, for example, throughput statistics, security status and statistics, capacity, status and statistics, security logging information, and/or operational logging information. Further, when the inventive system is placed in the "cloud," it may be further include an access and configuration capability to allow the outside party to customize the inventive system to, for example, manage users, enable/disable decisioning services, adjust decisioning services, and/or manage outside data sources.

Figure 10:
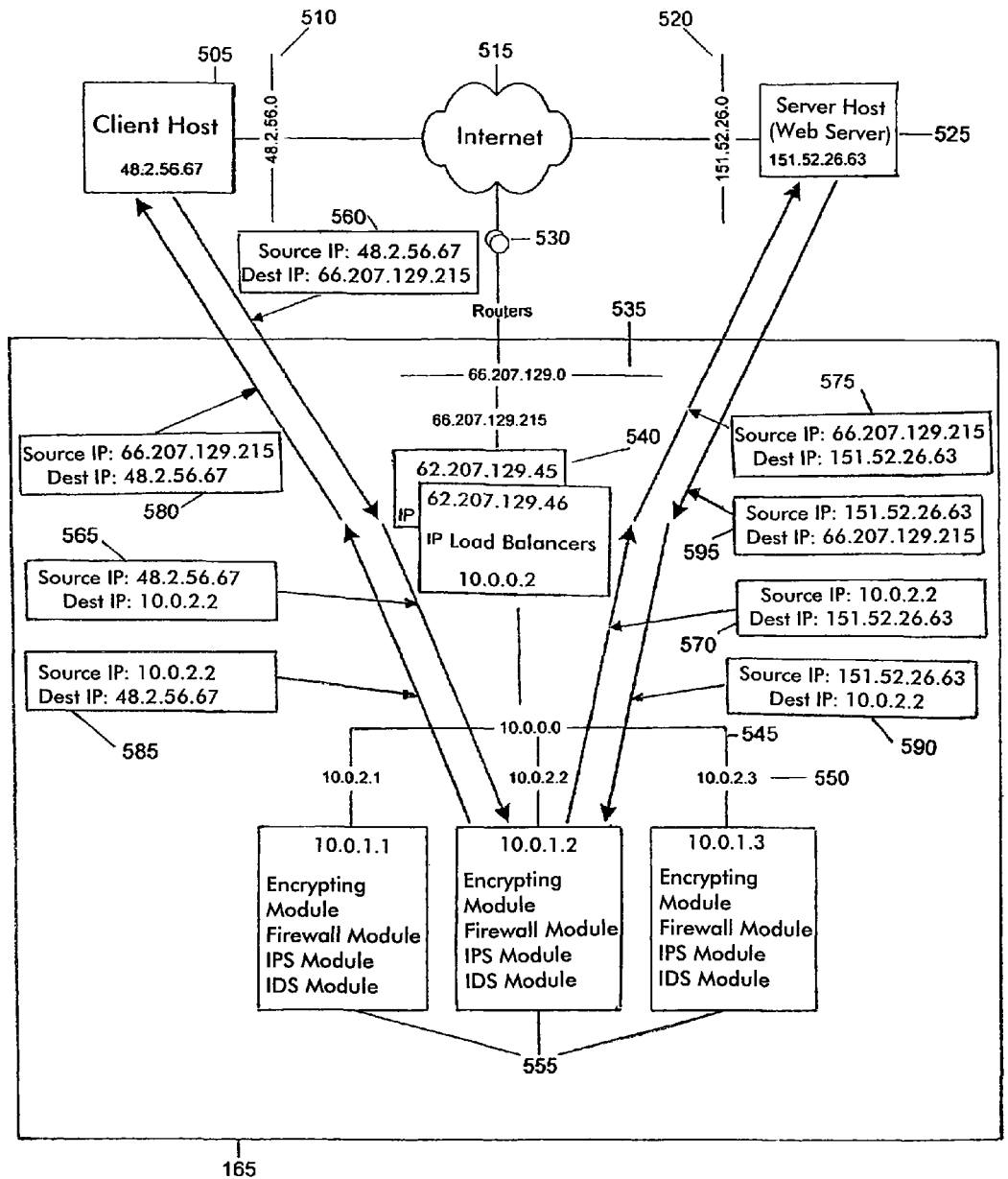
FIG. 10 is a network diagram of an alternative preferred embodiment of the inventive security system.

Finally, as shown in FIG. 10, each security sub-system 555 may include transformation capability, i.e., the encryption module allowing the sub-system to decrypt encrypted data. Preferably, the invention is utilized with format-preserving encryption. In this embodiment, the security system 165 is used in conjunction with a separate client-side system which transparently format-preserving encrypts the response data before the transmission thereof to the security system 165.

It is to be understood that the invention is not limited in its application to the details of construction and to the arrangements of the components set forth in this description or illustrated in the drawings. The invention is capable of other embodiments and of being practiced and carried out in various ways. Hence, it is to be understood that the phraseology and terminology employed herein are for the purpose of description and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the description be regarded as including such equivalent constructions insofar as they do not depart from the spirit and scope of the present invention.

What is claimed is:

1. A security system preventing unacceptable communications comprising:

a computing device located on a first network and having a network destination address, the computing device being operable to send a response pocket;

a client device operable to send a data packet to the first network, the packet being destined for the computing device, the client device having a client address; and a network security system remote from the first network and the client device, the network security system having a public address and including a load balancer and at least one network security subsystem having a private address, the load balancer of the network security subsystem being configured to receive the data packet destined for the computing device, the network security subsystem further including an intrusion detection module, wherein the data packet has a source address equal to the client address, a destination address equal to the public address thr the network security system, a packet header and a packet data;

wherein the load balancer is configured to translate the destination address of the packet from the public address of the network security system to the private address of the network security subsystem and to forward the packet to the intrusion detection module of the network security subsystem;

wherein the intrusion detection module is configured to determine whether the packet is an intrusion attempt;

wherein, if the packet is not the intrusion attempt, the network security subsystem is configured to translate the destination address for the packet to the address of the computing device, translate the packet source address to the public address of the network security system and forward the packet to the computing device;

wherein, if the packet is the intrusion attempt, the network security subsystem is configured to perform a network intrusion prevention technique;

wherein the load balancer of the network security system is further configured to receive the response packet, the response packet being destined for the client device and having a second source address equal to the address for the computing device, a second destination address equal to the public address for the network security system, a response packet header, and a second packet data;

wherein the load balancer of the network security system is further configured to translate the second destination address of the response packet to the private address of said network security subsystem and to forward the response packet to the intrusion detection module of said network security subsystem;

wherein the intrusion detection module is further configured to determine whether the response packet is an intrusion attempt, and if the response packet is not the intrusion attempt, to translate the second destination address for the response packet to the address for the client device and to forward the response packet to the load balancer which is further configured to translate the second source address for the response packet to the public address for the network security system, and to transmit the response packet to the translated second destination address; and wherein if the response packet is the intrusion attempt, the network security subsystem is configured to perform a network intrusion prevention technique.

2. The security system according to claim 1, wherein the intrusion detection module includes a first module operable to examine characteristics of the data packet, the characteristics including at least one of the packet header, the packet data and a packet content; and a second module operable to compare the characteristics with a predetermined content criteria; and wherein if the characteristics match the predetermined content criteria the packet is designated to be the intrusion attempt.

3. The security system according to claim 1, wherein the intrusion detection module includes means for identifying a source of the data packet, and wherein if the source of the data packet is identified as a malicious source the packet is designated to be the intrusion attempt.

4. The security system according to claim 1, wherein the security subsystem further comprises an encryption module operable to decrypt an encrypted data packet.

5. The security system according to claim 1, wherein the network intrusion prevention technique comprises: storing at least a partial copy of the packet; and storing a designation that packet characteristics matched a known network intrusion attempt signature.

6. The security system according to claim 1, wherein the network intrusion prevention technique comprises discarding the packet.

7. The security system according to claim 1, wherein the network intrusion prevention technique comprises generating an alert.

8. The security system according to claim 1, wherein the network intrusion prevent technique comprises generating a message to the computing device.

9. A security method for preventing unacceptable communications comprising the steps of:

providing a computing device on a first network, the computing device having a network destination address;

sending a data packet from a client device to the first network the packet being destined for the computing device, the client device having a client address;

providing a network security system remotely from the first network and the client device, the network security system having a public address and including a load balancer and at least one network security subsystem having a private address, the network security subsystem further including an intrusion detection module, the load balancer of the network security subsystem receiving the data packet destined for the computing device;

addressing the data packet such that the data packet has a source address equal to the client address, a destination address equal to the public address for the network security system, a packet header and a packet data;

at the load balancer, translating the destination address of the packet from the public address of the network security system to the private address of the network security subsystem and forwarding the packet to the intrusion detection module of the network security subsystem;

at the intrusion detection module, determining whether the packet is an intrusion attempt;

if the packet is not the intrusion attempt, translating the destination address for the packet to the address of the computing device, translating the packet source address to the public address of the network security system and forwarding the packet to the computing device;

if the packet is the intrusion attempt, performing a network intrusion prevention technique;

receiving a response packet at the load balancer of the network security system, the response packet being destined for the client device and having a second source address equal to the address for the computing device, a second destination address equal to the public address for the network security system, a response packet header, and a second packet data;

at the load balancer, translation the second destination address of the response packet to the private address of said network security subsystem and forwarding the response packet to the intrusion detection module of said network security subsystem;

at the intrusion detection module, determining whether the response packet is an intrusion attempt;

if the response packet is not the intrusion attempt, translating the second destination address for the response packet to the address for the client device and forwarding the response packet to the load balancer, and, at the load balancer, translating the second source address for the response packet to the public address for the network security system, and transmitting the response packet to the translated second destination address; and if the response packet is the intrusion attempt, performing the network intrusion prevention technique.

10. The security method according to claim 9, further comprising examining characteristics of the data packet at the intrusion detection module, the characteristics including at least one of the packet header, the packet data and a packet content; and comparing the characteristics with a predetermined content criteria; wherein if the characteristics match the predetermined content criteria the packet is designated to be the intrusion attempt.

11. The security method according to claim 9, further comprising identifying a source of the data packet, and, if the source of the data packet is identified as a malicious source, designating the packet as the intrusion attempt.

12. The security method according to claim 9, further comprising decrypting an encrypted data packet at an encryption module.

13. The security method according to claim 9, wherein the step of performing network intrusion prevention technique comprises: storing at least a partial copy of the packet; and storing a designation that packet characteristics matched a known network intrusion attempt signature.

14. The security method according to claim 9, wherein the step of performing net network intrusion prevention technique comprises discarding the packet.

15. The security method according to claim 9, wherein the step of performing network intrusion prevention technique comprises generating an alert.

16. The security method according to claim 9, wherein the step of performing network intrusion prevention technique comprises generating a message to the computing device.

* * * * *